UNITED STATES PATENT OFFICE.

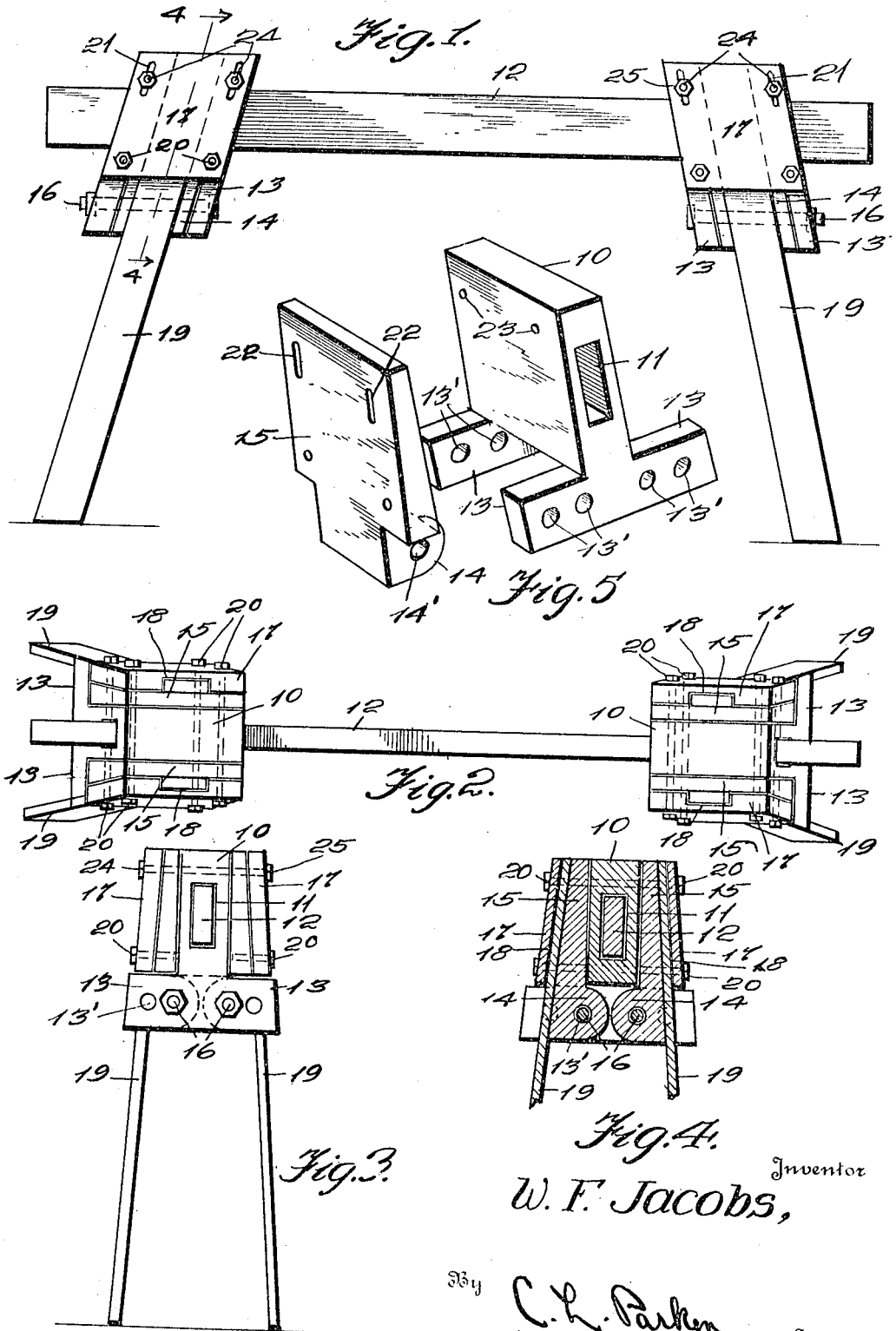

WILLIAM F. JACOBS, OF OTTAWA LAKE, MICHIGAN.

WORK-SUPPORTING HORSE.

1,256,235.　　　　Specification of Letters Patent.　　Patented Feb. 12, 1918.

Application filed March 31, 1917. Serial No. 158,885.

*To all whom it may concern:*

Be it known that I, WILLIAM F. JACOBS, a citizen of the United States, residing at Ottawa Lake, in the county of Monroe and State of Michigan, have invented certain new and useful Improvements in Work-Supporting Horses, of which the following is a specification.

My invention relates to improvements in work supporting horses.

An important object of the invention is to provide apparatus of the above mentioned character, formed of parts which may be conveniently assembled for use, and separated, for the purpose of shipment, storage or the like.

A further object of my invention is to provide a device of the above mentioned character, having means whereby the angularity of the legs may be adjusted, as desired.

Other objects and advantages of the invention will be apparent during the course of the following description.

In the accompanying drawings forming a part of this specification and in which like numerals are employed to designate like parts throughout the same, Figure 1 is a side elevation of a horse embodying my invention.

Fig. 2 is a plan view of the same,

Fig. 3 is an end elevation of the same,

Fig. 4 is a detail section taken on line 4—4 of Fig. 1, and,

Fig. 5 is a perspective view of a crosshead and coacting attaching member.

In the drawings, wherein for the purpose of illustration is shown a preferred embodiment of my invention, the numeral 10 designates cross-heads or blocks, having openings 11, to receive a horizontal beam 12.

At their lower ends, each cross-head 10 is provided with apertured knuckles 13, extending laterally beyond the cross-head for a substantial distance. These knuckles are rigidly secured to the cross-heads and may be formed integral therewith. The knuckles 13 are provided with spaced sets of openings 13', as shown.

Arranged between the knuckles 13 are knuckles 14, carried by preferably wedge-shaped attaching members 15. The knuckles 14 have openings 14', receiving detachable bolts 16, adapted to be passed through a selected set of the openings 13'.

Arranged upon the outer surfaces of the attaching members 15 are clamping plates 17, having openings 18 formed therein, for receiving legs 19. The plates 17 are secured to the attaching members 15 by means of short bolts 20, which do not engage with the cross-heads 10. The plates 17 are provided near their upper ends with elongated slots 21, in registration with elongated slots 22, formed in the attaching members 15, and adapted for registering with openings 23 in the cross-heads 10. Extending through the elongated slots 21 and 22, and the openings 23, are long pivoting bolts 24 carrying adjustable nuts 25.

From the foregoing description it is obvious that by proper manipulation of the bolts 20 and 24, the legs 19 may be longitudinally adjusted with respect to the cross-heads 10, and clamped thereto in adjustment at desired positions. By unscrewing the nuts 25 sufficiently, the attaching members 15 may be swung at their upper ends upon the bolts 24, whereby the bolts 16 may be removed, the lower ends of the attaching members 15 swung outwardly, so that the openings 14' may be brought into registration with the outer set of openings 13', and the bolts 16 passed through the outer set of openings 13' and the openings 14'. It is thus apparent that means are provided whereby the legs 19 may be angularly adjusted.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A work supporting horse, comprising a substantially horizontal beam, cross heads comprising blocks having longitudinal openings to receive the ends of the beam, pairs of spaced tranverse knuckles rigidly secured to the bottoms of the blocks and projecting laterally beyond the same for substantial distances upon opposite sides thereof and having spaced transverse openings, tapered attaching members arranged upon opposite sides of the blocks and provided near their upper ends with elongated slots and at their lower ends with apertured knuckles to be arranged between the pairs of spaced knuckles of the blocks, bolts adapted to be passed through selected apertures in the transverse knuckles and through the apertures in the knuckles of the attaching members, bolts passing through the upper ends of the blocks and through the elongated slots of the attaching members, legs arranged upon the outer sides of the attaching members, and plates securing the legs to the attaching members and engaging the bolts.

In testimony whereof I affix my signature in presence of two witnesses.

WILLIAM F. JACOBS.

Witnesses:
F. J. VANDERSEE,
JAMES A. WHITE.

Copies of this patent may be obtained for five cents each, by addressing the "Commissioner of Patents, Washington, D. C."